(12) United States Patent
Jahanshahi et al.

(10) Patent No.: US 9,196,048 B2
(45) Date of Patent: Nov. 24, 2015

(54) AUTONOMOUS PAVEMENT CONDITION ASSESSMENT

(71) Applicant: UNIVERSITY OF SOUTHERN CALIFORNIA, Los Angeles, CA (US)

(72) Inventors: Mohammad R. Jahanshahi, Pasadena, CA (US); Farrokh Jazizadeh Karimi, Los Angeles, CA (US); Sami F. Masri, Pasadena, CA (US); Burcin Becerik-Gerber, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 159 days.

(21) Appl. No.: 13/717,244

(22) Filed: Dec. 17, 2012

(65) Prior Publication Data

US 2013/0155061 A1    Jun. 20, 2013

Related U.S. Application Data

(60) Provisional application No. 61/576,599, filed on Dec. 16, 2011, provisional application No. 61/578,694, filed on Dec. 21, 2011.

(51) Int. Cl.
*G06T 7/00*        (2006.01)

(52) U.S. Cl.
CPC .............. *G06T 7/0081* (2013.01); *G06T 7/0004* (2013.01); *G06T 2207/10028* (2013.01); *G06T 2207/20148* (2013.01); *G06T 2207/30132* (2013.01); *G06T 2207/30256* (2013.01)

(58) Field of Classification Search
CPC ........... G01V 11/00; G01V 1/30; G01V 1/50; G01V 99/00; G01V 2210/646; Y10S 136/29; E01C 11/005; E01C 7/14; G01N 33/383; G01N 33/42; G01N 2203/0066; G01N 2203/0067; G01N 29/04; G01N 2203/027; G01N 21/956; G01N 33/24; G01N 3/00; G06F 17/5018; G06F 17/5009; G06F 2217/16; G06T 7/0002; G06T 2207/30132; G06T 2207/30252; G06T 7/0081; G06T 2207/10028; G06T 2207/20144; G06T 7/60; G01B 7/023; G01C 7/04; G01C 7/02
USPC .............. 703/2; 382/141, 100, 103, 172, 108, 382/199, 203; 356/237.2; 700/110; 702/5, 702/81; 340/436, 937; 348/128
See application file for complete search history.

(56) References Cited

U.S. PATENT DOCUMENTS 5,073,819 A * 12/1991 Gates et al. ................... 348/140
5,225,676 A    7/1993 Matsuya
(Continued)

FOREIGN PATENT DOCUMENTS

EP    1995592 A1    11/2008
JP    2011-242293 A    12/2011
(Continued)

OTHER PUBLICATIONS

Joubert et al.; Pothole Tagging System; Robmech 2011; Nov. 23-25, 2011.*
(Continued)

*Primary Examiner* — Carlos Perromat
(74) *Attorney, Agent, or Firm* — McDermott Will & Emery LLP

(57) ABSTRACT

An autonomous pavement assessment system may receive depth data indicative of the depth of pixels that collectively comprise multiple defective areas of pavement. For each defective area, the system may fit a plane to it; generate a histogram that indicates the frequency of its pixels at different depths; dynamically determine a depth noise threshold for it; generate a binary image of it based on its noise threshold; and generate a depth map of it containing only the pixels that have a depth that meets or exceeds its depth noise threshold. The system may prioritize the multiple defective areas for repair and/or generate optimized rehabilitation routes. Crowd sourcing may be used to gather the depth data, as well as location information for each defective area.

17 Claims, 10 Drawing Sheets

(56) References Cited

U.S. PATENT DOCUMENTS

| | | | |
|---|---|---|---|
| 5,835,619 A | 11/1998 | Morimoto et al. | |
| 6,615,648 B1 | 9/2003 | Ferguson et al. | |
| 6,682,261 B1 | 1/2004 | Karamihas et al. | |
| 6,813,592 B1* | 11/2004 | Dhondt | 703/2 |
| 6,983,065 B1 | 1/2006 | Akgul et al. | |
| 8,606,030 B2 | 12/2013 | Ning | |
| 8,649,557 B2* | 2/2014 | Hyung et al. | 382/103 |
| 8,873,837 B2 | 10/2014 | Jahanshahi et al. | |
| 2005/0207673 A1 | 9/2005 | Takane et al. | |
| 2006/0058974 A1 | 3/2006 | Lasiuk et al. | |
| 2008/0056532 A1 | 3/2008 | Alasia et al. | |
| 2008/0262345 A1* | 10/2008 | Fichtinger et al. | 600/426 |
| 2008/0292183 A1 | 11/2008 | DeLuca et al. | |
| 2009/0051082 A1 | 2/2009 | Nakamura et al. | |
| 2009/0110292 A1 | 4/2009 | Fujimura et al. | |
| 2010/0104168 A1 | 4/2010 | Dobbe | |
| 2010/0198517 A1 | 8/2010 | Scott et al. | |
| 2011/0066390 A1 | 3/2011 | MacLeod et al. | |
| 2011/0135215 A1 | 6/2011 | Tay | |
| 2012/0257086 A1 | 10/2012 | Nakasugi et al. | |
| 2013/0018575 A1* | 1/2013 | Birken et al. | 701/409 |
| 2013/0034305 A1 | 2/2013 | Jahanshahi et al. | |
| 2013/0051652 A1 | 2/2013 | Calvet et al. | |

FOREIGN PATENT DOCUMENTS

| | | |
|---|---|---|
| WO | WO 0173476 A1 | 10/2001 |
| WO | WO 2011042386 A1 | 4/2011 |
| WO | WO 2011065169 A1 | 6/2011 |
| WO | WO2011069191 A1 | 6/2011 |

OTHER PUBLICATIONS

International Search Report and Written Opinion of the International Searching Authority (KIPO), dated Apr. 25, 2013, for PCT Application PCT/US2012/069927, filed Dec. 14, 2012, entitled "Autonomous Pavement Condition Assessment."

Bray, J. et al. 2006. A Neural Network Based Technique for Automatic Classification of Road Cracks. Neural Networks, 2006. IJCNN '06: 2006 International Joint Conference on Neural Networks, Sheraton Vancouver Wall Centre Hotel, Vancouver, BC, Canada, Jul. 16-21, 2006, pp. 907-912.

Cafiso, S. et al. 2006. Evaluation of Pavement Surface Distress Using Digital Image Collection and Analysis. Proceedings of the Seventh International Congress on Advances in Civil Engineering, Oct. 11-13, 2006, Yildiz Technical University, Istanbul, Turkey, 10 pages.

Cord, A. et al. 2011. Automatic Road Defect Detection by Textural Pattern Recognition based on AdaBoost. Computer-Aided Civil and Infrastructure Engineering, 2011, pp. 1-16.

Fukuhara, T. et al. 1990. Automatic Pavement-Distress-Survey System. Journal of Transportation Engineering, vol. 116, No. 3, pp. 280-286.

Gavilan, M. et al. 2011. Adaptive Road Crack Detection System by Pavement Classification. Sensors, vol. 11, No. 10, pp. 9628-9657.

Hou, Z. et al. 2007. Experimentation of 3d pavement imaging through stereovision. International Conference on Transportation Engineering, 2007 (ICTE 2007), vol. 246. ASCE, pp. 376-381.

Koch, C. et al. 2011. Pothole Detection in Asphalt Pavement Images. Advanced Engineering Informatics, vol. 25, No. 3, pp. 507-515.

Lee, B. et al. 2004. Position-Invariant Neural Network for Digital Pavement Crack Analysis. Computer-Aided Civil and Infrastructure Engineering, vol. 19, No. 2, pp. 105-118.

Li, Q. et al. 2010. A Real-Time 3D Scanning System for Pavement Distortion Inspection. Measurement Science and Technology, vol. 21, No. 1, Article ID: 015702 (8 pp.).

Li, Q. et al. 2011. Pavement Crack Classification via Spatial Distribution Features. EURASIP Journal on Advances in Signal Processing, 2011, Article ID: 649675 (12 pp.).

Ma, C. et al. 2009. Pavement Cracks Detection Based on FDWT. Computational Intelligence and Software Engineering, 2009. CiSE 2009. International Conference on. 4 pp.

Nguyen, T.S. et al. 2009. Automatic Detection and Classification of Defect on Road Pavement Using Anisotropy Measure. In Proceedings of the 17th European Signal Processing Conference (EUSIPCO 2009), Glasgow, Scotland, Aug. 24-28, 2009 (EURASIP '2009), pp. 617-621.

Nguyen, T.S. et al. 2011. Free-Form Anisotropy: A New Method for Crack Detection on Pavement Surface Images. 18th IEEE International Conference on Image Processing, Brussels, Belgium, IEEE, pp. 1093-1096.

Salari, E. et al. 2011. Automated Pavement Distress Inspection Based on 2d and 3d Information. IEEE International Conference on Electro/Information Technology (EIT). 1-4.

Tanaka, N. et al. 1998. A Crack Detection Method in Road Surface Images Using Morphology. MVA'98, IAPR Workshop on Machine Vision Applications, Nov. 17-19, 1998, Makuhari, Chiba, Japan, pp. 154-157.

Ying, L. et al. 2009. Beamlet transform based technique for pavement image processing and classification, Electro/Information Technology, 2009. EIT '09. IEEE International Conference on , vol., No., pp. 141-145, Jun. 7-9, 2009.

Yu, X. et al. 2011. Pavement Pothole Detection and Severity Measurement Using Laser Imaging. IEEE International Conference on Electro/Information Technology (EIT), 5 pages.

Zhibiao, S. et al. 2010. Algorithm on Contourlet Domain in Detection of Road Cracks for Pavement Images. In Proceedings of the 2010 Ninth International Symposium on Distributed Computing and Applications to Business, Engineering and Science (DCABES), IEEE, pp. 518-522.

Zhou, J. et al. 2003. Wavelet-Based Pavement Distress Detection and Evaluation. Proceedings of SPIE, vol. 5207, pp. 728-739.

Zhou, J. et al. 2005. Wavelet-based pavement distress image compression and noise reduction. Proceedings of SPIE, vol. 5914. SPIE, Item No. 59141Zm, 11 pages.

Chen, ZQ et al 2010. Image-Based Framework for Concrete Surface Crack Monitoring and Quantification. Advances in Civil Engineering, vol. 2010, Article ID 215295, 18 pages [doi: 10.1155/2010/215295].

Fisher, R.A. 1936. The Use of Multiple Measurements in Taxonomic Problems, Annals of Eugenics, vol. 7, pp. 179-188.

Hu, Y. et al. 2010. Automatic Pavement Crack Detection Using Texture and Shape Descriptors. IETE Technical Review [serial online] vol. 27, pp. 398-405 [available from http://tr.ietejournals.org/text.asp?2010/27/51398/62225], published online Aug. 11, 2010.

Jain, A.K. et al. 1991. A K-Nearest Neighbor Artificial Neural Network Classifier. IJCNN-91 Seattle International Joint Conference on Neural Networks, Jul. 8-14, 1991, vol. II, pp. 515-520 [doi: 10.1109/IJCNN.1991.155387].

Lowe, D.G. 2004. Distinctive Image Features from Scale-Invariant Keypoints. International Journal of Computer Vision, vol. 60, pp. 91-110.

Otsu, N. 1979. A Threshold Selection Method from Gray-Level Histograms. IEEE Transactions on Systems, Man, and Cybernetics, pp. 62-66.

Salembier, P. 1990. Comparison of Some Morphological Segmentation Algorithms Based on Contrast Enhancement: Application to Automatic Defect Detection. Proceedings of the EUSIPCO-90, Fifth European Signal Processing Conference, pp. 833-836.

Sinha, S.K. et al. 2006. Neuro-Fuzzy Network for the Classification of Buried Pipe Defects. Automation in Construction, vol. 15, pp. 73-83.

Sinha, S.K. et al. 2006. Segmentation of Buried Concrete Pipe Images. Automation in Construction, vol. 15, pp. 47-57.

Snavely, K.N. 2008. Scene Reconstruction and Visualization from Internet Photo Collections, Ph.D. Thesis, University of Washington, Seattle.

Office Action, dated Mar. 14, 2014 for U.S. Appl. No. 13/567,943, filed Aug. 6, 2012, entitled Image-Based Crack Detection, Jahanshahi et al., inventors.

(56) References Cited

OTHER PUBLICATIONS

International Search Report and Written Opinion of the International Searching Authority (KIPO), dated Feb. 26, 2013, for PCT Application No. PCT/US2012/049796, entitled "Image-Based Crack Detection," filed Aug. 6, 2012, Jahanshahi et al., inventors, University of Southern California, applicant.

International Search Report and Written Opinion of the International Searching Authority (KIPO), dated Jan. 3, 2012, for PCT Application No. PCT/US2012/049800, entitled "Image-Based Crack Quantification," filed Aug. 6, 2012, Jahanshahi et al., inventors, University of Southern California, applicant.

U.S. Patent and Trademark Office. 2015. Office Action, dated Mar. 2, 2015, for U.S. Appl. No. 13/567,969, Jahanshahi et al., inventors, entitled "Image-Based Crack Quantification," filed Aug. 6, 2012.

* cited by examiner

AUTONOMOUS PAVEMENT CONDITION ASSESSMENT

CROSS-REFERENCE TO RELATED APPLICATIONS

This application is based upon and claims priority to U.S. provisional patent applications 61/576,599, entitled "AUTONOMOUS PAVEMENTS DEFECT DETECTION AND QUANTIFICATION," filed Dec. 16, 2011, attorney docket number 028080-0701 and 61/578,694, entitled "AUTONOMOUS PAVEMENT CONDITION ASSESSMENT SYSTEM," filed Dec. 21, 2011, attorney docket number 028080-0702. The entire content of each of these applications is incorporated herein by reference.

STATEMENT REGARDING FEDERALLY SPONSORED RESEARCH

This invention was made with government support under Grant Nos. CNS-0325875 and ANI-0206275, awarded by the National Science Foundation. The Government has certain rights in the invention.

BACKGROUND

1. Technical Field

This disclosure relates to the assessment of pavement conditions, including the assessment of defects in pavement.

2. Description of Related Art

Current pavement condition assessment procedures can be very time consuming, laborious, and expensive. In addition, these approaches can pose safety threats to personnel involved in the process.

The roads and highways in the United States are used to travel approximately three trillion miles annually. According to an American Society of Civil Engineers's (ASCE) report card for America's infrastructure, however, the overall evaluation grade for this infrastructure is a D—close to failing. Among all the infrastructure categories, roads have one of the lowest grades, going down from a grade of D to D—from 2005 to 2009.

Driving on roads in need of repair has been estimated to cost U.S. motorists $67 billion a year in extra vehicle repairs and operating costs. In addition to the deleterious effects on vehicles, safety can also be significantly affected by pavement conditions. From 2005 to 2009, a total of 198,546 people died on U.S. highways. In one-third of these traffic fatalities, roadway conditions played a significant role.

Over $150 billion may be needed annually for substantial improvement of highway conditions, but only $70.3 billion per year has been allocated for highway condition improvement.

Conventional pavement condition assessment procedures include manual or semi-automated approaches. In these approaches, trained personnel may survey conditions of road surfaces, detect pavement distresses, measure severity, and classify the distresses. The manual assessment process can be very time consuming, laborious, and expensive. In addition, it can pose safety threats to the personnel involved in the process. Although the assessment may be carried out by trained raters, the result may lack consistency due to subjectivity in the detection and classification processes.

In semi-automated systems, the process of data acquisition may be carried out using vehicles capable of data collection equipped with cameras or laser sensors. However, the condition assessment of these pavements surfaces may still be done manually by trained raters, and thus still be prone to inconsistencies.

Limitations in manual pavement assessment methods have brought about automated defect assessment. In many commercial pavement assessment tools, image processing approaches are employed for defect detection. However, environmental conditions such as light/shadow condition, different background textures, and non-crack patterns can compromise the assessment outcome. Performance evaluation of various commercially available systems show that they may all may have problems with non-crack patterns, which may result in false crack detection.

The developed image processing tools may also be limited in their ability to differentiate between different types of defects, especially when it comes to defects that are problematic, such as potholes, ravelings, and fatigue cracks. Although automated approaches and specially image processing methods have been researched, manual survey methods are still the predominant approach.

One of the tools for improving detection of defects with three dimensional geometry is laser scanners. However, both image-based and laser scanner-based methods can be expensive. In some cases, equipment costs can be a barrier in adopting the automated method in practice, such as when there is still a need for trained raters to undertake the quality assurance process.

Various integrated systems have been devised to facilitate data collection using special vans that can record data while moving with traffic speed. Generally, these systems use video cameras or laser sensors as the main sensor for capturing pavement conditions. Examples include Automated Road Analyzer (ARAN) equipped with area scan cameras and strobe, infrared lighting and Digital Highway Data Vehicle (DHDV) equipped with a laser-based imaging system, PAVUE equipped with multiple video cameras or line scan cameras, and HARRIS equipped with line scan cameras and advanced lighting system.

Komatsu, used in Japan, uses photomultiplier tube technology for capturing pavement surface images. There are also systems such as CREHOS, SIRANO, and GIE. In most of these systems, image processing tools are employed for defect detection. WiseCrax and Automated Distress Analyzer (ADA) are examples of such tools for analysis of pavement data, captured by ARAN and DHDV systems, respectively.

Image processing approaches may be deployed mainly for detecting various types of cracks in pavements. For other pavement quality factors, such as rut-depth and pavement surface roughness, laser scanning and ultrasonic sensors may be deployed to sense the longitudinal and transversal profile of the road, for evaluating and quantifying these factors.

Various efforts have been made to develop or improve automated approaches for pavement surface assessment. Image processing methods have been the focus of the majority of the research studies. However, using image processing for pavement surface assessment can be a challenging task due to noises such as discoloration and diversity in pavement textures. Many researchers have tried to address the challenges in defect detection and classification, and various unsupervised and supervised segmentation approaches have been employed.

Unsupervised approaches have used default pixels on pavement images. Tanaka and Uematsu (1998) employed morphological segmentation using the structural information of the defect. Hu and Zhao (2010) proposed a modified local binary pattern (LBP) approach to increase robustness against noise. Gavilan et al. (2011) adopted a seed-based approach for defect detection, and used a Support Vector Machine (SVM) classifier to distinguish between different pavement texture types. Zhibiao and Yanqing (2010) used counterlet transform on gray-scale images, along with directionality and anisotropy, for reducing the effect of noise on defect detection.

Other research studies employed anisotropy measure and anisotropy diffusion to reduce the noise level on pavement images. Medina et al. (2010) enhanced the segmentation process by combining traditional features and Gabor filters. Wavelet transform techniques were also explored for decomposing pavement images into different subbands for defect detection, isolation, and severity evaluation. Ma et al. (2009) adopted fractional differential and a wavelet transform-based approach to improve the detection process in the presence of noise. Ying and Salari (2010) employed beamlet transform-based technique as an approach that is insensitive to image noise for crack detection.

Supervised approaches are also used to detect defects in pavement images through classification. Neural networks have been used in many studies. Kaseko et al. (1994) compared the performance of a two-stage piecewise linear neural network with Bayes and k-nearest neighbor classifiers. Different types of neural network models including, image-based, histogram-based, and proximity-based were employed and compared by Lee and Lee (2004). Moment features for neural network models were used in some of the studies. Bray et al. (2006) used neural networks for defect detection and classification based on density and histogram features. Li et al. (2011) demonstrated the application of spatial distribution features, including direction and density features, by using a neural network.

Cord and Chambon (2011) employed the AdaBoost technique to distinguish between defect-laden versus non-defect-laden pavement images. Different type of pavement cracks are the main subjects of these image processing research studies in which defect pixels are segmented using thresholding algorithms. However, selecting the appropriate threshold value has been challenging. Although advanced algorithms have been adopted, limited success has been achieved due to challenges such as poor contrast resulting from a reduced image amplitude range, and noises from shadow and lane markings. Moreover, the severity of the defects are only determined by direct measurements in the pavement surface plane.

Potholes and ravelings are other types of pavement distresses which are important, especially for maintenance planning, due to their significant effect on the quality of pavement, and concomitant economic and safety threats to motorists. For these types of distresses, the depth information can also be an important factor in determining the severity and extent of the defect.

Image processing has also been used for detecting potholes in pavement images. The distinct shape (i.e., approximately elliptical) of potholes, darker areas of shadows in potholes, and texture differences between insides and outsides of potholes are features that were used by Koch and Brilakis (2011) to automate detection of potholes in images.

However, due to the 3D geometry of defects like potholes and ravelings, most of the research studies adopted depth information in the assessment process. Stereovision is one of the methods that has been used for acquiring the depth information. Salari and Bao (2011) combined stereovision techniques with conventional image processing methods to use depth information for applying a probabilistic relaxation on captured images and to reduce the noise effect. Wang (2004) and Hou et al. (2007) also proposed stereovision techniques to create 3D surface models of the pavement for condition assessment. They have also discussed the challenges for complete 3D reconstruction by using stereovision methods due to the complexity of feature matching.

Laser scanning systems have also been used for 3D surface data acquisition. Laser sensors are mainly employed for road surface roughness and rutting measurements. Bursanescu et al. (2001) proposed a 3D vision system based on laser sensors to obtain road surface profiles. Moreover, Yu and Salari (2011) presented a laser imaging technique for pothole detection and severity estimation. Li et al. (2010), used a 3D transverse scanning technique based on infrared laser sensors, and proposed a system for 3D surface profile generation for the detection of pavement distortions such as rutting and shoving. Although laser scanning systems may provide highly accurate geometrical data of the pavement profile and distresses, the cost of the sensors may still be relatively high, which may limit their application in routine pavement assessment.

In the United States, various local and federal standards and guidelines have been developed for pavement management. Each these standards defines nomenclature for evaluating visible pavement defects. Description of the defects, possible causes, severity level, and measurement method are the main characteristics that almost all of the standards/manuals cover for pavement distress assessment.

AASHTO (2003), ASTM (1999), and FHWA (2003) are some of the primary standards in the U.S. According to the Federal Highway Administration (FHWA) guidelines, cracks including longitudinal, transverse, and block cracking, are evaluated using three levels of severity. Cracks with a mean width of 6 mm or less are categorized as low-severity cracks. A mean width between 6 mm to 19 mm is the width for moderate-severity cracks. A mean width more than 19 mm is the criterion for high-severity cracks.

For patching distress, which is the replacement of the original pavement, the criteria for severity assessment is rutting depth. The rutting depth intervals for patching are less than 6 mm, 6 mm to 12 mm and more than 12 mm, for low, moderate and high severities, respectively. For potholes which are bowel-shaped with a minimum dimension of 150 mm, depth is again the main criterion for severity. Potholes less than 25 mm in depth are categorized as low severity; potholes 25 mm to 50 mm deep are moderate; and potholes more than 50 mm deep are evaluated as high severity potholes (FHWA, 2003). Except for the cracks, the rest of the defects in pavements are usually categorized based on depth information.

Accordingly, there has been a need for efficient and economical assessment methods that can detect and quantify defects to provide reliable information for the maintenance of critical defects. Critical defects are those that need to be prioritized in the maintenance schedule in order to enhance the safety and reduce vehicle maintenance costs for motorists.

SUMMARY

An autonomous pavement assessment system may receive depth data indicative of the depth of pixels that collectively comprise a defective area of pavement. The system may dynamically determine a depth noise threshold based on characteristics of the depth data. The system may generate a depth map of only the pixels that comprise the defective area that have a depth that meets or exceeds the depth noise threshold.

The system may generate a binary image of the defective area based on the noise threshold. The binary image may delineate pixels that meet or exceed the noise threshold as a central portion of the defective area and pixels that fail to exceed the noise threshold as a surrounding portion of the defective area. The system may restrict the area covered by the depth map to the central portion of the defective area.

The system may generate a histogram of the defective area that indicates the frequency of pixels at different depths within the defective area. The system may determine the depth noise threshold based on the histogram. The system may determine the depth noise threshold using the Otsu method.

The system may fit a plane to the defective area that passes through an upper surface of the defective area. The system may fit the plane using RANSAC. The system may subtract the depth data for the defective area from the fitted plane.

The system may determine the surface area, volume, depth, length and/or width of the defective area demarcated by the depth map.

The system may receive depth data indicative of the depth of pixels that collectively comprise multiple defective areas of pavement. The system may identify the multiple defective areas of pavement based on the depth data. The system may receive and store location information indicative of the location of each defective area. The system may determine a depth noise threshold for each defective area based on characteristics of the depth data for that defective area. The system may generate a depth map for each defective area that includes only the pixels that comprise the defective area that meet or exceed the depth noise threshold for that defective area.

The system may prioritize the multiple defective areas for repair based on the depth maps.

The system may generate optimized rehabilitation routes based on the depth maps and the location information.

The depth data may be indicative of the depth of the same pixels at multiple, different times. The system may project the likely progress of the defect area based on the depth data.

The system may receive an RGB image of the defective area of pavement and utilize this RGB image in the analysis of the defective area.

The system may generate and analyze the depth map in an unsupervised manner without training of the system.

The system may include multiple vehicles. Each vehicle may have a depth sensor configured to generate depth data indicative of the depth of pixels that collectively comprise pavement over which the vehicles travel. The depth sensor may be a MICROSOFT KINECT® motion sensing input device. Each vehicle may have a location sensor configured to generate location data indicative of the locations of the pavement at which the depth data is generated. The location sensor may be a GPS system.

The depth data may include data about the same defective area from more than one of the vehicles. The system may eliminate redundancies in the depth data caused by multiple sets of data about the same defective area from more than one of the vehicles.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Figure 1:
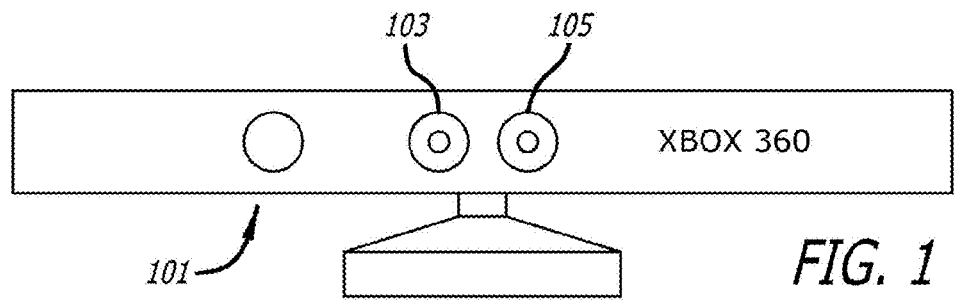
FIG. 1 illustrates a MICROSOFT KINECT® motion sensing input device and its integrated sensors.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An RGB-D sensor system may be used to detect and quantify defects in pavements. This sensor system may include an RGB color camera and an infrared projector and camera that collectively act as a depth sensor.

The approach may not need any training and may interpret the data sensed by this powerful and inexpensive sensor.

This system may provide autonomous, cost-effective condition assessment of roads and transportation systems. Various road conditions, including patching, cracks, and potholes may be robustly and autonomously detected and quantified.

The RGB-D sensor may be MICROSOFT KINECT® motion sensing input device. This product includes an RGB color camera and an infrared depth sensor. The approach may be used for detecting and quantifying defects in pavements. The approach may use pavement surface depth images and may be remarkably inexpensive (at present, $150 per sensor). Using the approach, various pavement defects including patching, severe cracks, and potholes can be detected robustly, without any need for training, and then accurately quantified autonomously.

An RGB-D sensor may simultaneously provide an RGB image and a depth image for a scene. This type of sensor may be useful for defect detection and quantification in pavements. The RGB image can be used to detect small defects (i.e., cracks), and the depth image may be used to detect and quantify gross defects (i.e., potholes). MICROSOFT KINECT® motion sensing input device, a RGB-D sensor system, may be used to collect the depth image to detect and to quantify 3D defects in pavements.

MICROSOFT KINECT® motion sensing input device is an integrated device consisting of an Infrared (IR) projector, an IR camera, and a color camera. MICROSOFT KINECT® motion sensing input device generates three outputs: IR, RGB, and depth images. The IR projector projects a known infrared pattern onto a scene and, based on the pattern's deformation as captured by the IR camera, depth may be determined. The resolution of the depth image is currently 640×480pixels with 11-bit depth. This provides 2,048 levels of sensitivity. MICROSOFT KINECT® motion sensing input device has horizontal and vertical fields of view of 57° and 43°, respectively. MICROSOFT KINECT® motion sensing input device can obtain depth ranges of approximately 0.7 to 6.0 m. The maximum rate of data acquisition for MICROSOFT KINECT® motion sensing input device is currently 30 fps. Despite the incorporation of several sensors in this device, its price is (currently) $150 due to the mass production of this system as an input device for the MICROSOFT XBOX 360® home video game console.

FIG. illustrates a MICROSOFT KINECT® motion sensing input device and its integrated sensors. This includes an infrared projector 101, an RGB camera 103, and an infrared camera 105.

MICROSOFT KINECT® motion sensing input device may obtain the depth image by imaging a known IR pattern. When the object under inspection is exposed to direct sunlight, the IR component of the sunlight may alter the known IR pattern and all the captured depth values may be zero. However, if the object is in shadow (i.e., indirect sunlight), MICROSOFT KINECT® motion sensing input device may obtain the depth information accurately. MICROSOFT KINECT® motion sensing input device may also provide depth images in total darkness. MICROSOFT KINECT® motion sensing input device may provide accurate depth images in the presence of artificial light sources, such as typical street lights.

Defects in pavements may be defined as surface deformations that are greater than a threshold.

There may be noise in the captured depth data, such as roughness in the pavement that does not constitute a defect. The depth image plane may also not be parallel to the surface that is under inspection. FIGS. 2A-2H illustrate an example of image processing steps that may be used to filter out this noise in captured depth data, so as to accurately detect defects in pavement.

Figure 2A:
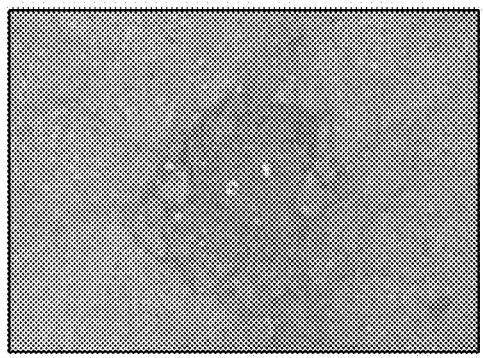
FIG. 2A illustrates an example of an image of a pothole that may be captured by the RGB camera in MICROSOFT KINECT® motion sensing input device.
Figure 2B:
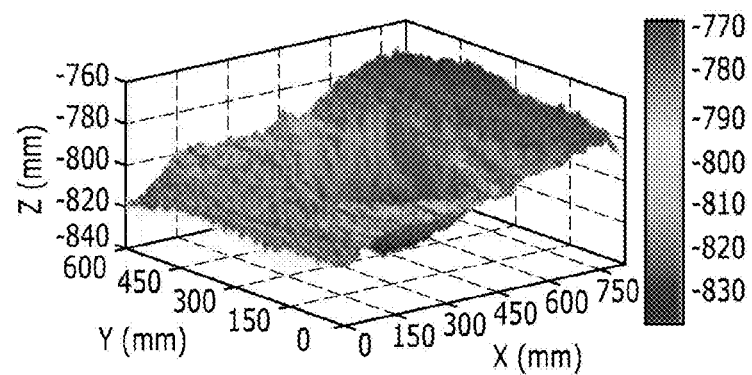
FIG. 2B illustrates depth data of the pothole that may be captured by the depth sensor in MICROSOFT KINECT® motion sensing input device.

FIG. 2A illustrates an example of an image of a pothole that may be captured by the RGB camera in MICROSOFT KINECT® motion sensing input device. FIG. 2B illustrates depth data of the pothole that may be captured by the depth sensor in MICROSOFT KINECT® motion sensing input device.

Figure 2D:
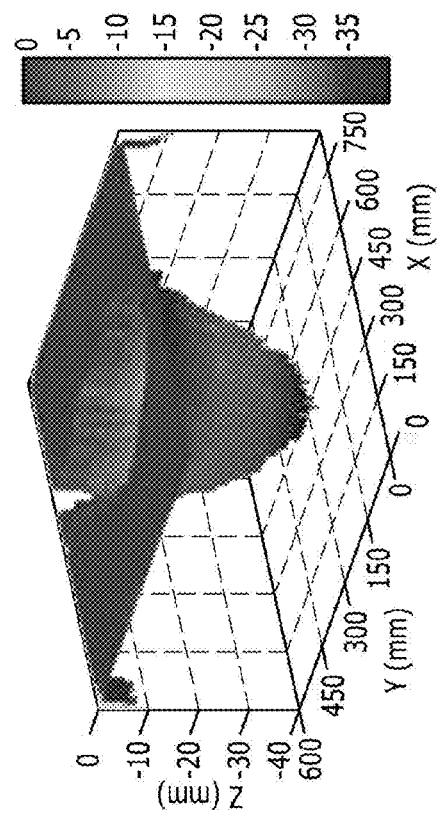
FIG. 2D illustrates depth data of the pothole after being subtracted from the fitted plane.
Figure 2C:
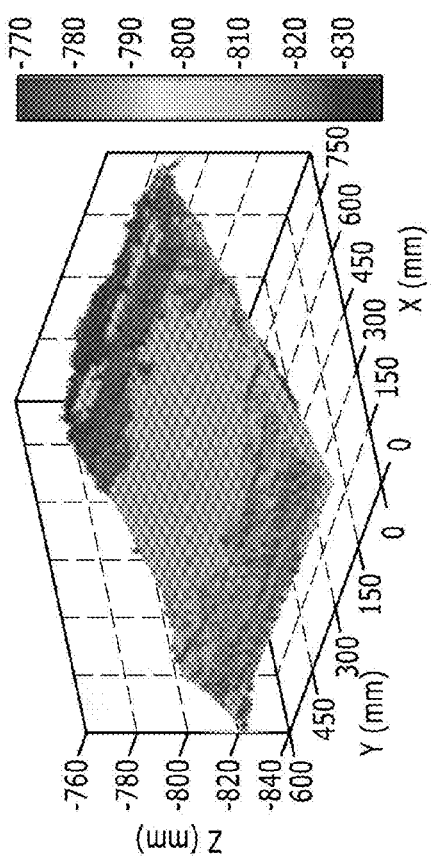
FIG. 2C illustrates fitting a plane to the surface of the pothole.

FIG. 2C illustrates fitting a plane to the surface of the pothole. First, a plane may be fitted to the points in the depth image that are not farther than a threshold from the IR camera, as illustrated in FIG. 2C. This threshold may be the camera-object distance plus twice the standard deviation of the errors described in the MICROSOFT KINECT® motion sensing input device initialization section. In order to fit a plane to the points, the RANSAC algorithm may be used. See Fischler, M. A. and Bolles, R. C. (1981). "Random sample consensus: a paradigm for model fitting with applications to image analysis and automated cartography." *Communications of the ACM,* 24(6), 381-395. In this approach, a number of points may be randomly chosen to calculate the fitted plane. Those points with distances greater than a threshold (e.g., 1.0 cm) with respect to the fitted plane may be classified as outliers. This procedure may be repeated several times until the least amount of total distances (i.e., errors) is calculated, and the minimum number of outliers are detected.

FIG. 2D illustrates depth data of the pothole after being subtracted from the fitted plane. Depth differences less than a threshold (e.g., 5 mm) may be set as zero. By doing this, a flat and horizontal surface may be obtained for non-defect regions, as illustrated in FIG. 2D.

Figure 2E:
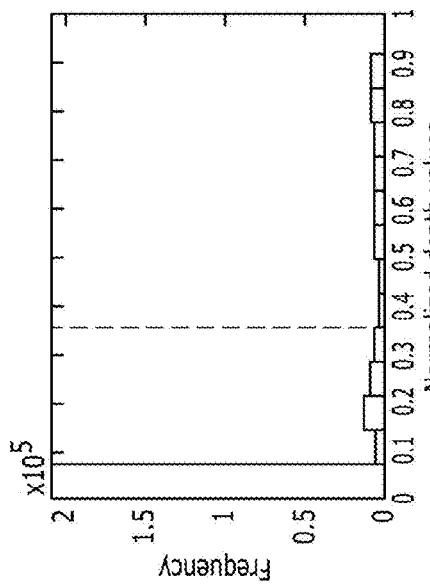
FIG. 2E illustrates a grayscale representation of the depth data illustrated in FIG. 2D.

FIG. 2E illustrates a grayscale representation of the depth data illustrated in FIG. 2D. The depth-difference image may be normalized by dividing each pixel value by the maximum relative depth. In this way, pixel (i.e., relative depth) values may vary between 0 and 1, as illustrated in FIG. 2E.

Figure 2G:
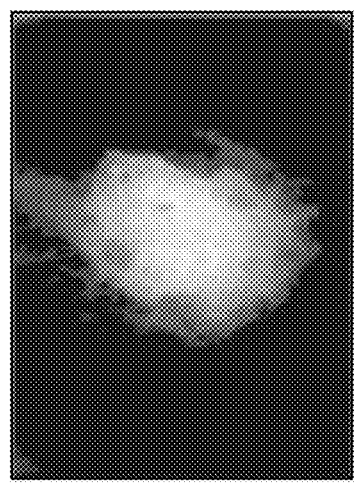
FIG. 2G illustrates the detected defect obtained by binarizing the greyscale representation in FIG. 2E using the Otsu threshold in FIG. 2F.
Figure 2F:
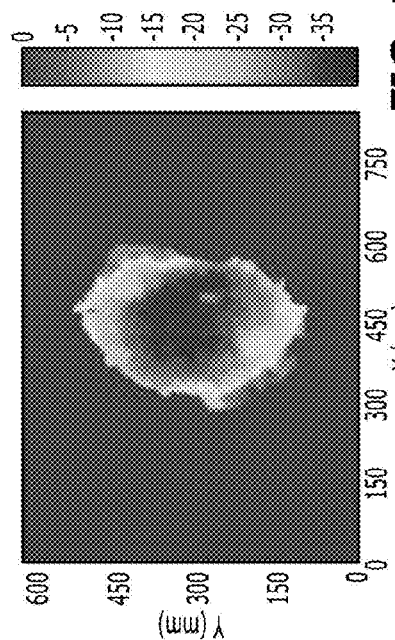
FIG. 2F illustrates a histogram of the grayscale representation illustrated in FIG. 2E with a vertical threshold line at about 0.35 that may be derived using the Otsu thresholding method.

FIG. 2F illustrates a histogram of the grayscale representation illustrated in FIG. 2E with a vertical threshold line at about 0.35 that may be derived using the Otsu thresholding method. See Otsu, N. (1979). "A threshold selection method from gray-level histogrmas." *IEEE Transactions on Systems, Man, and Cybernetics,* 9(1), 62-66. The Otsu thresholding method may minimize intra-class variance and may be performed on a histogram of normalized depth values to discriminate between the depressed and flat regions, as illustrated in FIG. 2F.

FIG. 2G illustrates the detected defect obtained by binarizing the greyscale representation in FIG. 2E using the Otsu threshold in FIG. 2F. The depth values of the pixels classified as deep regions may be examined to test if they are greater than a threshold (e.g., 10 mm) to avoid false positive detections due to pavement surface roughness. In this way, the system may check if the deep pixels have at least 10 mm depth. The output of this system may be a binary image, where the white pixels represent regions with depth of at least 10 mm, as illustrated in FIG. 2F.

Figure 2H:
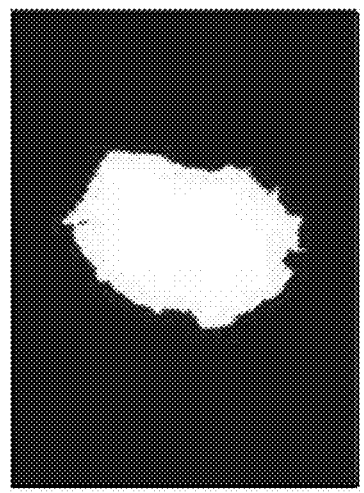
FIG. 2H illustrates a depth color map that is based on the greyscale representation illustrated in FIG. 2E of the portion of the pothole that is white in FIG. 2G.

FIG. 2H illustrates a depth color map that is based on the greyscale representation illustrated in FIG. 2E of the portion of the pothole that is white in FIG. 2G.

Using the depth-image obtained by the MICROSOFT KINECT® motion sensing input device, the maximum depth of the defect regions may be computed. In one example, the MICROSOFT KINECT® motion sensing input device may be installed 77.8 cm from the ground, and the size of each depth pixel may be 1.38 mm. Using this unit length, the area of a defect region in a frame may be computed as the integration of the white pixels in the defect binary image:

$$A = l_p^2 \sum_y \sum_x p(x, y), \quad (1)$$

where A is the total defect area, $l_p$ is the size of a pixel (i.e., 1.38 mm), x and y are pixel coordinates, and p(x, y) is a binary value, obtained from the defect binary image (FIG. 2G, indicating whether the pixel at (x, y) is detected as a defect (i.e., (x, y) ∈ $D_{Defect}$) or not:

$$p(x, y) = \begin{cases} 1 & (x, y) \in D_{defect}, \\ 0 & \text{otherwise.} \end{cases} \quad (2)$$

Since the depth for each pixel is available in the depth image, the integration of all small volumes represented by each pixel leads to the total volume of material lost in the frame:

$$V = l_p^2 \sum_y \sum_x d(x, y) \times p(x, y), \quad (3)$$

where V is the total defect volume, and d(x, y) is the depth value at (x, y).

In order to estimate the width and length of a detected defect in a frame, 18 rectangles (by rotating rectangles between 0 and 90 degrees with 5 degree increments) that are the bounding box of the detected defect may be fitted to each defect. The rectangle with the minimum area may be selected as the optimum bounding rectangle, and the width and length of this rectangle may be used to estimate the length and width of the defect.

Figure 3:
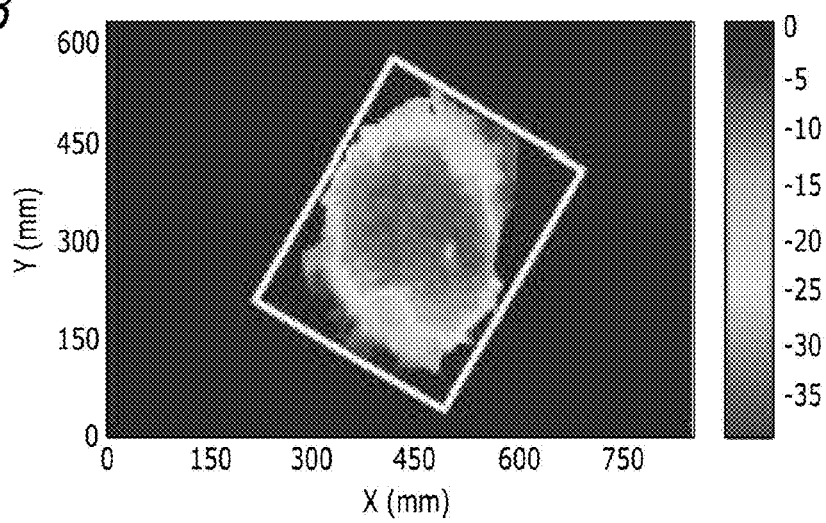
FIG. 3 illustrates an example of an optimum bounding box on the detected defect illustrated in FIGS. 2A-2H.

FIG. 3 illustrates an example of an optimum bounding box on the detected defect illustrated in FIGS. 2A-2H. The angle between the main axis of the bounding box and the horizontal direction may be 60°. The maximum computed length and width in this figure may be 410 mm. These quantities (i.e., width, length, depth, area, and volume) may be used to prioritize a large number of defects for repair efforts.

Along with quantifying and prioritizing defects, the defects may be localize and an optimum pavement rehabilitation route may be determined based on their depth maps and locations. The location coordinates of the vehicle when each pavement imaging frame is captured, as specified by a GPS or other type of location tracking system, may be recorded and stored in association with each image frame.

To evaluate the utility and reliability of the MICROSOFT KINECT® motion sensing input device system, the following experiment was performed. The distance between the MICROSOFT KINECT® motion sensing input device and a plane was measured using a highly accurate laser range finder. Then, 1600 depth values, which represent the distance between the MICROSOFT KINECT® motion sensing input device and the reference plane, were extracted from a sample video image. For each distance, nine frames were evaluated resulted in 14,400 depth values.

Figure 4A:
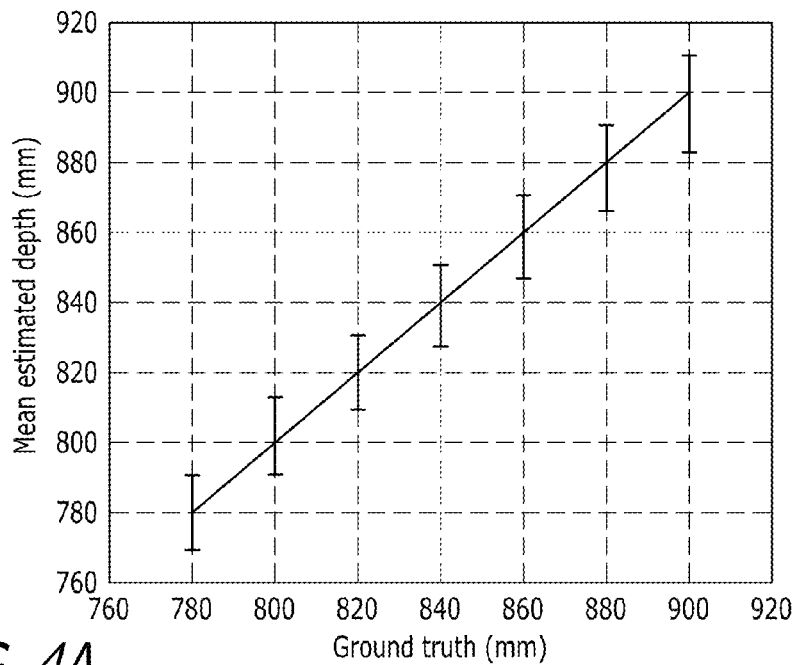
FIG. 4A illustrates mean estimated distance values obtained from a MICROSOFT KINECT® motion sensing input device during this experiment, along with ground truth obtained from a laser range finder.

FIG. 4A illustrates mean estimated distance values obtained from a MICROSOFT KINECT® motion sensing input device during this experiment, along with ground truth obtained from a laser range finder. The solid line shows the ideal relation and the mean estimated distances are shown by 'x' with the bars indicating two standard deviations. In this figure, the lengths of the confidence intervals are four times the standard deviation of the estimated thicknesses for each point. The solid line shows the ideal relationship between the actual and estimated thicknesses.

Figure 4B:
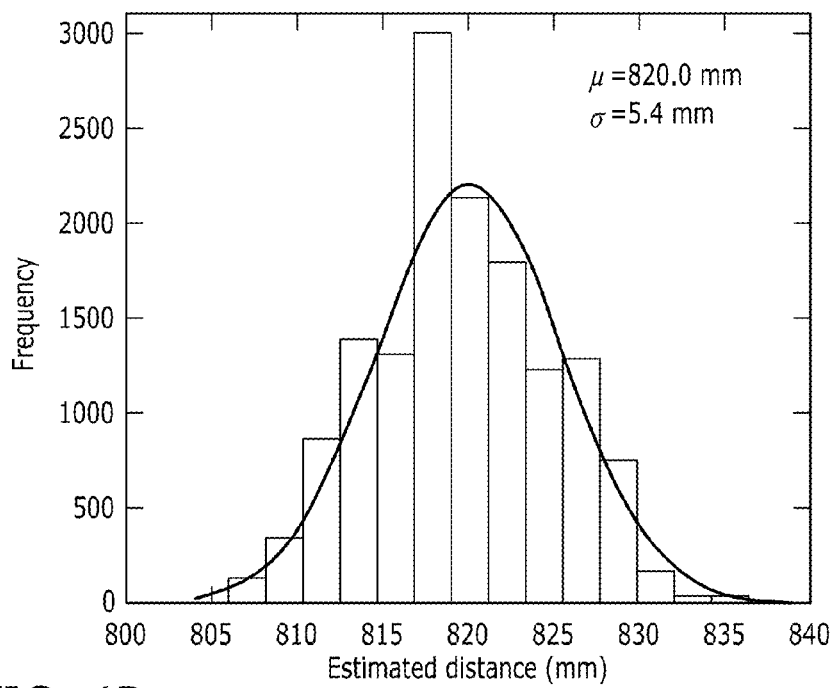
FIG. 4B illustrates a histogram of the distance estimations for the (sample) distance of 819 mm.

FIG. 4B illustrates a histogram of the distance estimations for the (sample) distance of 819 mm. In order to provide some insight regarding the distribution of the estimated values, a normal histogram with the same mean and standard deviation is superposed on this histogram for comparison purposes. This figure indicates that the majority of the estimations are clustered around the mean estimated value, which is 820 mm. The corresponding standard deviation is 5.4 mm and coefficient of variation is $C_v = \sigma/\mu = 6.6 \times 10^{-3}$ This experiment shows that MICROSOFT KINECT® motion sensing input device can be used to accurately detect defects that are deeper than 12 mm without any calibration.

Figure 5:
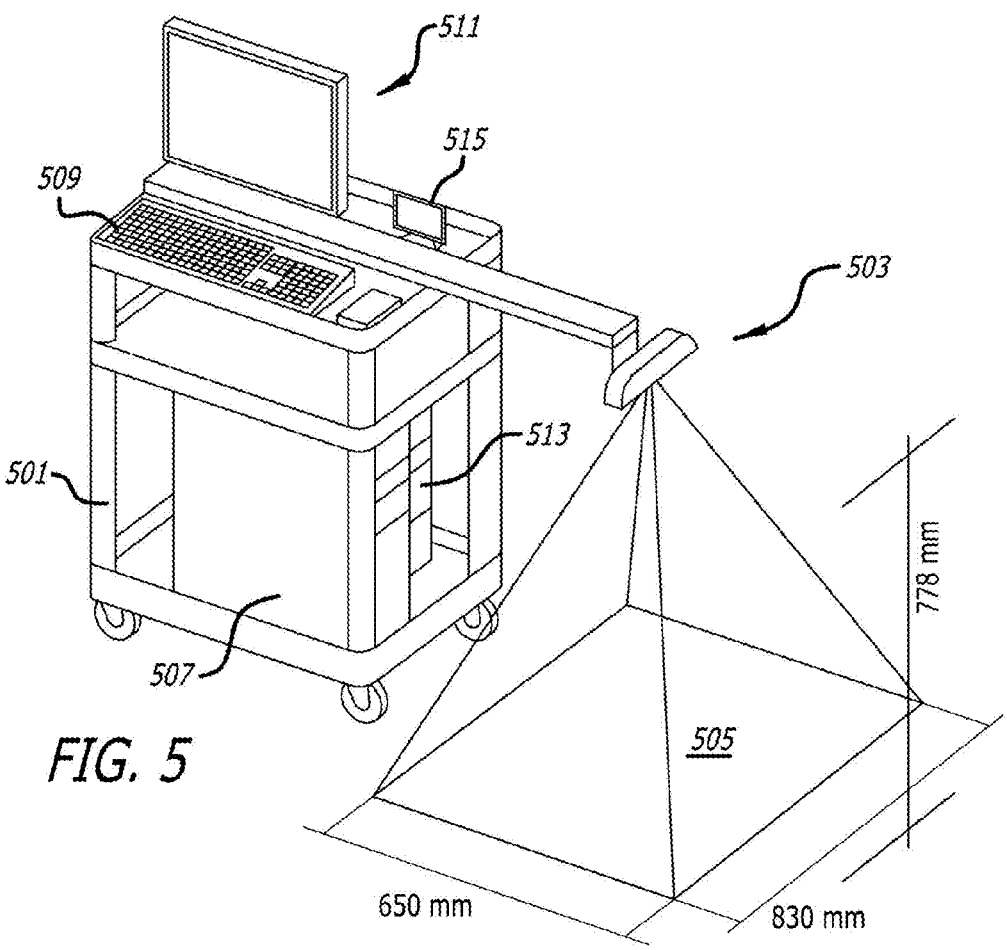
FIG. 5 illustrates a simple data acquisition system that was used in a study.

FIG. 5 illustrates a simple data acquisition system that was used in this study. As illustrated in FIG. 5, the system includes a mobile cart 501 with sensing and computing modules. A MICROSOFT KINECT® motion sensing input device 503 was installed at a distance of about 650 mm away from the mobile cart 501 to provide a line-of-sight free of occlusion. The MICROSOFT KINECT® motion sensing input device 503 was installed 77.8 cm from the ground, which resulted in a 830×650 square millimeters field of view 505. The computing module included an off-the-shelf desktop computer 507, keyboard 509, display 511, and mobile power supply 513.

The system was equipped with a GPS module 515 that localized the defects during field experiments. For practical applications, the data acquisition system may be mounted on and/or within a vehicle to collect the data.

For the test bed, and after an initial visual inspection, some of the streets on the northern side of the University of Southern California (USC) campus were selected. Multiple types of defects, including cracks, potholes, and patchings with various levels of severity, were taken into account when choosing the test beds. The data acquisition system was either manually navigated or installed on a van, in order to explore various practical (field) application conditions. The data acquisition process was carried out for 62 defects of different types with various severity, pavement surface texture, and under different lighting conditions, including varying degrees of natural light and artificial street light after sunset. In this process, considering the proposed algorithm for defect detection and quantification, the sensor was only adjusted visually to be horizontal.

In order to evaluate the detection performance of the proposed system, 78 depth images (25 with potholes, 32 with cracks, 5 with patching, and 16 were defect-free frames) were processed using the approach described above. Also, the defect-free regions of defective frames were included in the performance analysis as negative alerts.

Table 1 shows the overall performance indices for the experiment that was performed.

TABLE 1

The overall performance of the proposed defect detection system

| Accuracy (%) | Precision (%) | Sensitivity (%) | Specificity (%) |
| --- | --- | --- | --- |
| 83.9 | 91.0 | 87.9 | 91.2 |

In this table, "Accuracy" is the proportion of the true classifications in the test set; "Precision" is the proportion of true positive classifications against all positive classifications; "Sensitivity" is the proportion of actual positives that were correctly classified; and "Specificity" is the proportion of negatives that were correctly classified.

The detection rate for cracks, potholes, and patching were 78%, 92.0%, and 80%, respectively. These defects were categorized based on the guidelines mentioned above. Only moderate or high-severity cracks were used for this evaluation. The low-severity cracks may not be detected using the proposed approach because the fixed IR pattern may not penetrate into the tight gaps between crack edges. Consequently, depth information about such defects may not be obtained using depth image data.

According to the obtained results, the system may detect the defects that have a minimum lateral dimension of 15 mm and minimum depth of 12 mm. Cracks have also been included in the test set and detection accuracy may be increased by removing them. As seen from the results, potholes are detected at a higher rate than other defects.

Figure 6A:
FIGS. 6A-6P illustrate RGB images of a variety of detected defects and their corresponding depth maps obtained using the autonomous method described herein.
Figure 6B:
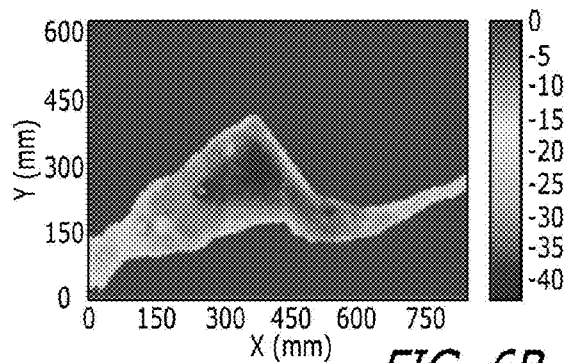
Figure 6C:
Figure 6D:
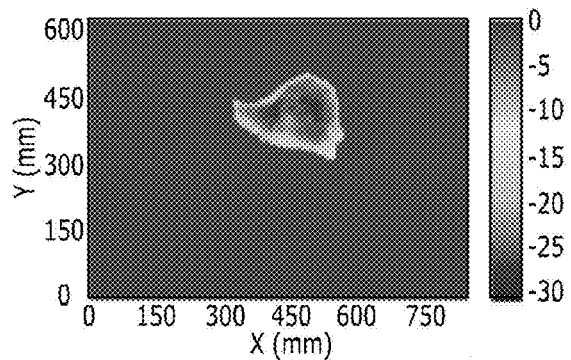
Figure 6E:
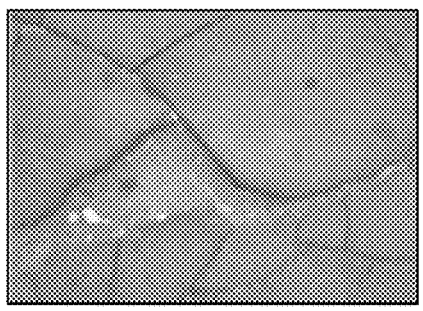
Figure 6F:
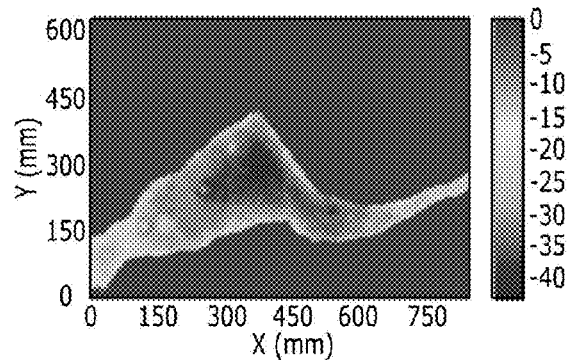
Figure 6G:
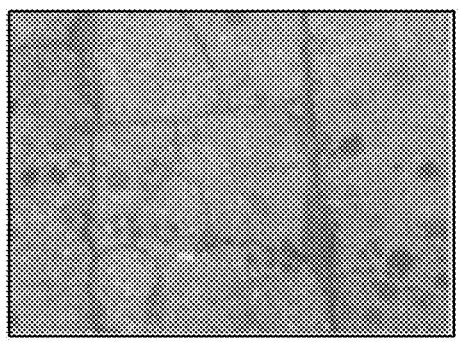
Figure 6H:
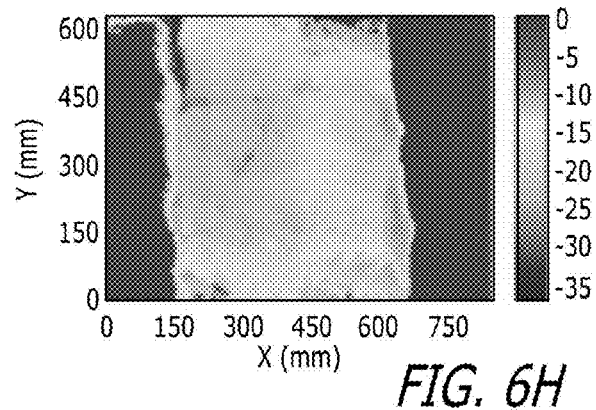
Figure 6I:
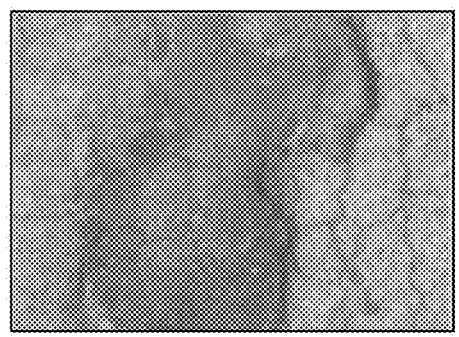
Figure 6J:
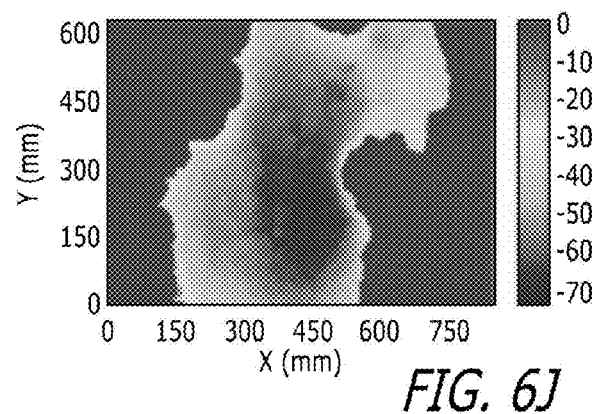
Figure 6K:
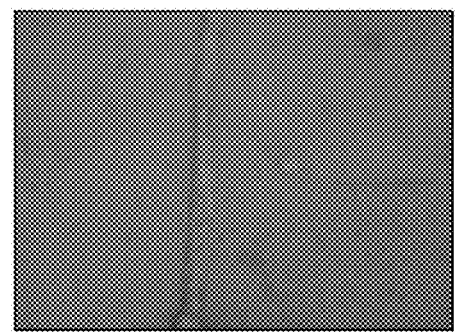
Figure 6L:
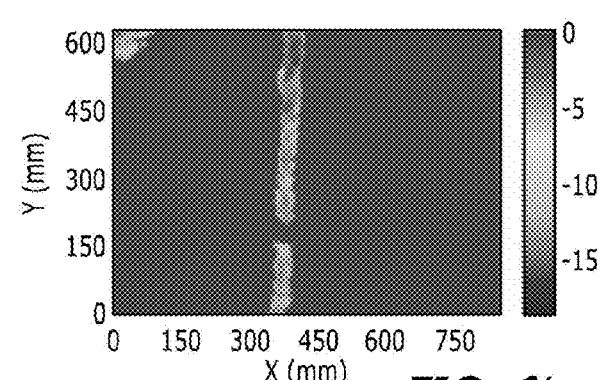
Figure 6M:
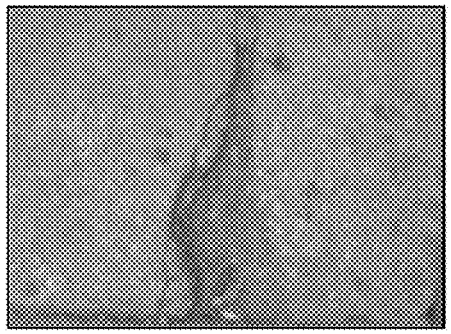
Figure 6N:
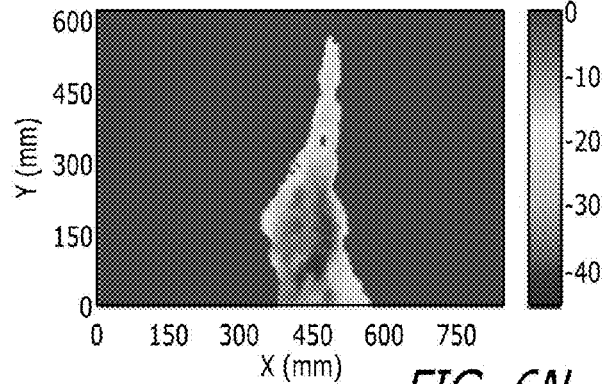
Figure 6O:
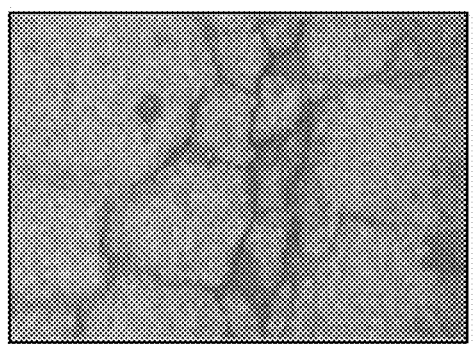
Figure 6P:
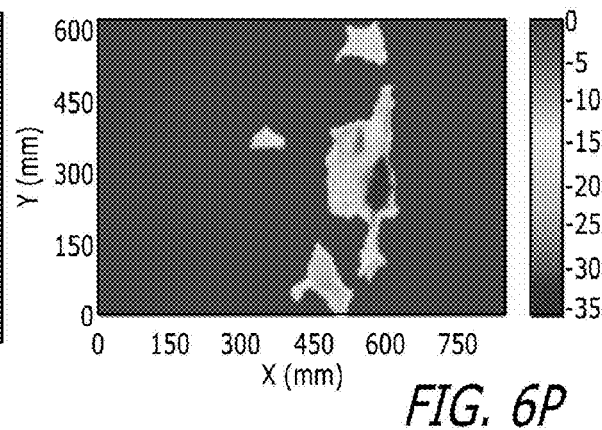

FIGS. 6A-6 illustrate RGB images of a variety of detected defects and their corresponding depth maps obtained using the method described above. FIGS. 6A, 6C, 6E, 6G, 6I, 6K, 6M, and 6O are RGB images of the defects. FIGS. 6B, 6D, 6F, 6H, 6J, 6L, 6N, and 6P are corresponding depth maps, respectively.

The detected types of defects in this figure included potholes, patching, and cracks. The distribution of the defects and their locations were obtained using captured coordinates during data collection, and visualized using GOOGLE MAPS® web mapping service.

Figure 7:
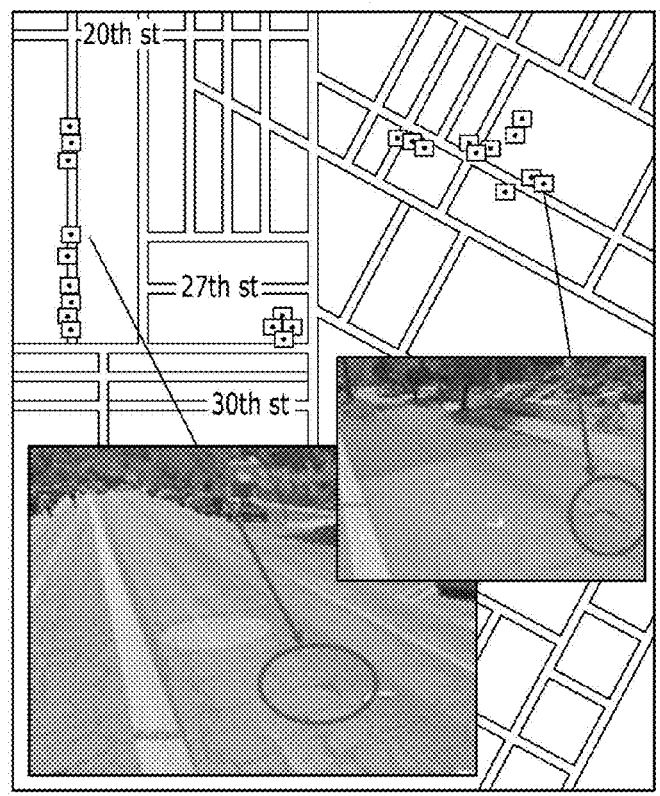
FIG. 7 illustrates localization of defects using a GPS device.

FIG. 7 illustrates localization of the defects using a GPS device. As can be seen in FIG. 7, a GOOGLE STREET VIEW® stitched image viewer may be effective for defect visualization purposes.

Figure 8:
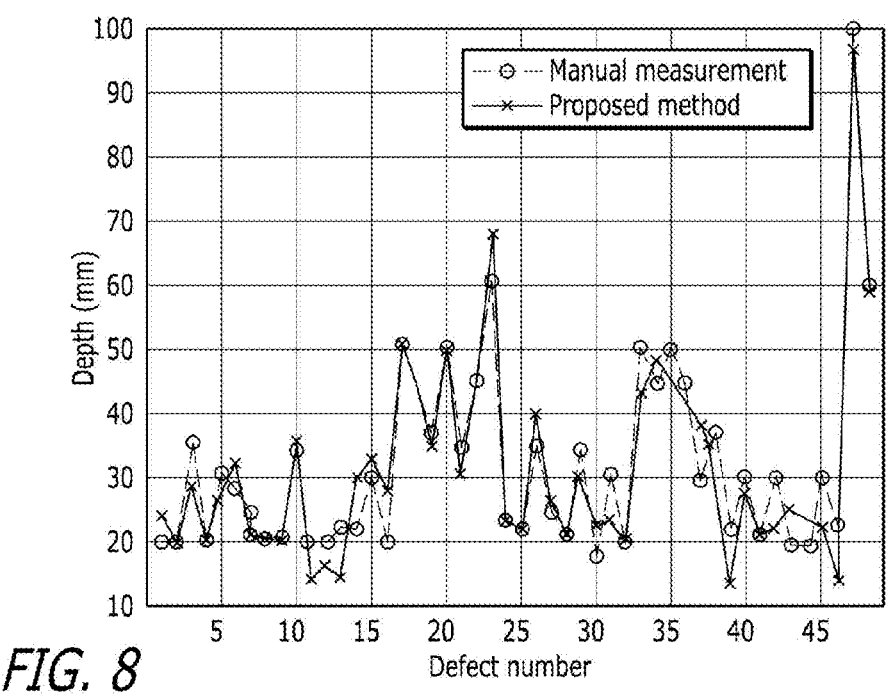
FIG. 8 illustrates depth values obtained from manually measuring the depth of defects using a tape, compared with values obtained from the autonomous method described herein.

FIG. 8 illustrates depth values obtained from manually measuring the depth of defects using a tape, compared with the values obtained from the autonomous method described above. Forty-eight depths were measured. As seen from this figure, the autonomous method has estimated depth values very close to the manual approach.

Table 2 summarizes depth values obtained from the manual approach and the autonomous depth quantification method:

TABLE 2

Comparison of depth values obtained from field experiment using the traditional manual approach and the proposed method

| Manual measurement (mm) | Proposed method (mm) | Manual measurement (mm) | Proposed method (mm) | Manual measurement (mm) | Proposed method (mm) |
|---|---|---|---|---|---|
| 20 | 24 | 50 | 51 | 50 | 43 |
| 20 | 19 | 45 | 45 | 45 | 48 |
| 35 | 29 | 35 | 32 | 30 | 46 |
| 20 | 21 | 50 | 46 | 45 | 42 |
| 30 | 28 | 35 | 31 | 30 | 38 |
| 28 | 32 | 45 | 42 | 37 | 30 |
| 25 | 21 | 60 | 67 | 22 | 14 |
| 20 | 20 | 23 | 23 | 30 | 27 |
| 20 | 18 | 22 | 19 | 22 | 21 |
| 35 | 37 | 32 | 39 | 30 | 22 |
| 15 | 14 | 25 | 26 | 20 | 25 |
| 20 | 16 | 20 | 21 | 20 | 24 |
| 22 | 14 | 34 | 30 | 30 | 22 |
| 22 | 30 | 18 | 22 | 22 | 14 |
| 30 | 33 | 30 | 23 | 100 | 96 |
| 20 | 27 | 20 | 19 | 60 | 58 |

The maximum difference between the manual approach and the autonomous method was only 8 mm. The root mean square value and the average error between the two methods, shown in Table 2, are 4.7 mm and 14.03%, respectively.

In order to evaluate the performance of the autonomous method, the maximum length and width of twenty defects were measured manually and measurements were also obtained using the autonomous approach.

Figure 9A:
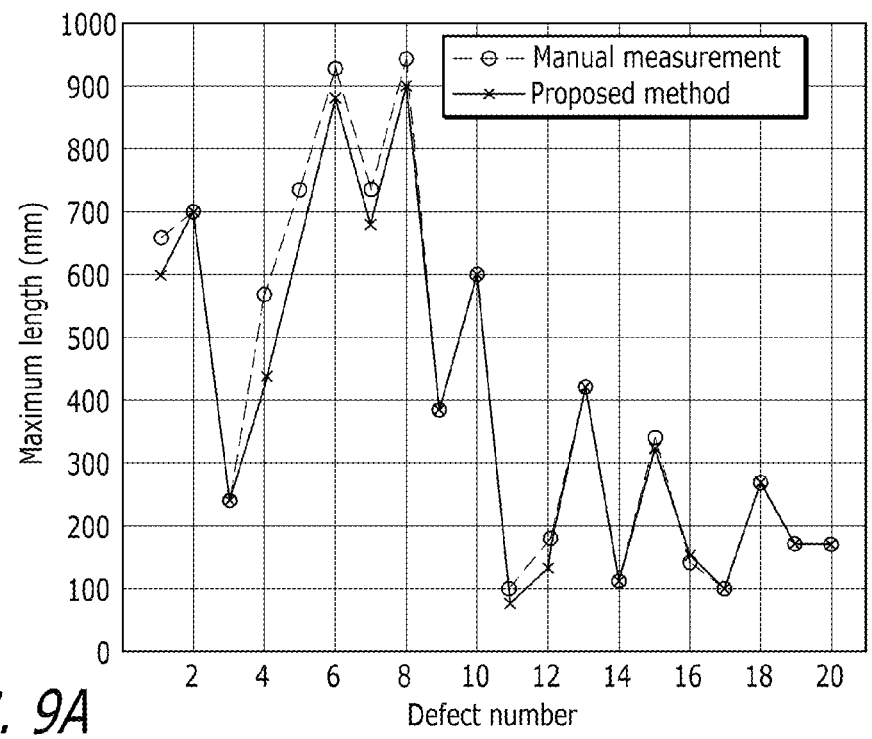
FIGS. 9A and 9B compare manual measurements versus measurements generated by the autonomous method described herein.
Figure 9B:
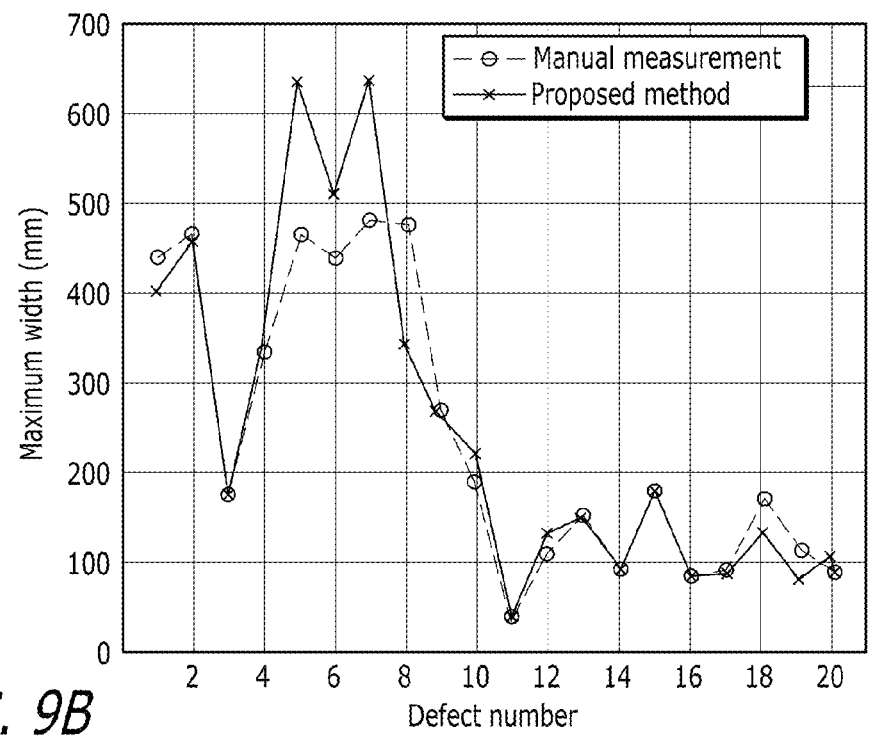

FIGS. 9A and 9B compare manual measurements versus the autonomous method. As seen from FIG. 9A, the estimated lengths are close to the manually-measured ones (except for defects 4 and 5). FIG. 9B illustrates a comparison of widths. Except for defects 5, 6, 7, and 8, the autonomous widths are also close to the values obtained from the manual approach.

Table 3 summarizes these maximum length and width of defects:

TABLE 3

Comparison of maximum length and width of defects obtained from manual measurement and the proposed method

| | Manual measurement | | Proposed method | | Relative error | | Proposed method | | | |
|---|---|---|---|---|---|---|---|---|---|---|
| Defect No. | Length (mm) | Width (mm) | Length (mm) | Width (mm) | Length (%) | Width (%) | Max. depth (mm) | Mean depth (mm) | Area (cm$^2$) | Volume (cm$^3$) |
| 1 | 659 | 440 | 606 | 401 | 8.09 | 8.80 | 46 | 34 | 1652 | 5647 |
| 2 | 693 | 462 | 703 | 453 | 1.47 | 2.01 | 57 | 43 | 2245 | 9641 |
| 3 | 242 | 179 | 202 | 179 | 8.16 | 0.12 | 30 | 22 | 298 | 666 |
| 4 | 569 | 336 | 432 | 354 | 24.04 | 5.33 | 40 | 21 | 729 | 1525 |
| 5 | 738 | 463 | 643 | 634 | 12.87 | 37.08 | 72 | 54 | 2643 | 14186 |
| 6 | 925 | 441 | 878 | 510 | 5.08 | 15.59 | 73 | 52 | 2846 | 14807 |
| 7 | 741 | 478 | 683 | 634 | 7.78 | 32.54 | 40 | 20 | 3351 | 6775 |
| 8 | 940 | 473 | 893 | 336 | 4.98 | 28.98 | 43 | 40 | 1108 | 4478 |
| 9 | 387 | 275 | 396 | 265 | 2.27 | 3.49 | 30 | 20 | 650 | 1321 |
| 10 | 618 | 191 | 591 | 222 | 4.35 | 16.37 | 45 | 31 | 613 | 1893 |
| 11 | 96 | 38 | 76 | 47 | 20.66 | 22.66 | 15 | 14 | 23 | 33 |
| 12 | 182 | 111 | 136 | 130 | 25.28 | 17.61 | 25 | 20 | 90 | 184 |
| 13 | 426 | 148 | 422 | 154 | 0.92 | 3.97 | 36 | 23 | 335 | 770 |
| 14 | 105 | 92 | 108 | 96 | 2.49 | 4.22 | 21 | 18 | 58 | 107 |
| 15 | 342 | 188 | 321 | 179 | 6.09 | 4.83 | 45 | 36 | 148 | 536 |

TABLE 3-continued

Comparison of maximum length and width of defects obtained from manual measurement and the proposed method

| | Manual measurement | | Proposed method | | Relative error | | Proposed method | | | |
|---|---|---|---|---|---|---|---|---|---|---|
| | | | | | | | Max. | Mean | | |
| Defect No. | Length (mm) | Width (mm) | Length (mm) | Width (mm) | Length (%) | Width (%) | depth (mm) | depth (mm) | Area (cm$^2$) | Volume (cm$^3$) |
| 16 | 144 | 84  | 159 | 85  | 10.09 | 0.77  | 37 | 34 | 64  | 215 |
| 17 | 96  | 91  | 108 | 92  | 12.74 | 0.69  | 43 | 32 | 54  | 174 |
| 18 | 270 | 168 | 274 | 136 | 1.59  | 19.05 | 28 | 19 | 168 | 318 |
| 19 | 183 | 117 | 171 | 83  | 6.33  | 28.92 | 21 | 17 | 87  | 152 |
| 20 | 182 | 96  | 176 | 110 | 8.97  | 15.11 | 26 | 21 | 102 | 219 |

The relative errors are also included in this table. While for some defects the estimated length and width values are close, for few cases, the relative error is more than 20%. This is due to the shape complexity of these defects that may not be represented appropriately by an optimum bounding box, which may lead to high errors. The overall mean relative error values in Table 3 are 8.71% and 13.41% for the maximum length and width, respectively.

There may be a need to improve the robustness of the proposed length and width estimation approach; however, as mentioned above, the majority of defects in pavements may be categorized based on the depth of the defect rather than the length and width values.

Table 3 also includes the maximum and average depth, the area, and the volume of each detected defect computed by the autonomous method.

In summary, an autonomous approach has been presented which is based on using Microsoft MICROSOFT KINECT® motion sensing input device, which includes an RGB color camera and an infrared depth sensor, for detecting and quantifying defects in pavements. This system is inexpensive. In order to detect defects, a plane may be fitted to points in the depth image obtained by MICROSOFT KINECT® motion sensing input device. Subsequently, the depth image may be subtracted from the fitted plane. Next, the depth-difference image may be normalized by dividing each pixel value by the maximum relative depth. The Otsu thresholding method may be performed on the histogram of the normalized depth values to discriminate between the depressed and flat regions.

Using this autonomous approach, various pavement defects, including patching, severe cracks, and potholes were detected robustly without any need for training and, most importantly, quantified accurately. Although the accuracy of the MICROSOFT KINECT® motion sensing input device was evaluated in this study, no specific calibration was needed; however, calibration of the MICROSOFT KINECT® motion sensing input device can compensate for depth image disorder, and consequently lead to more accurate results. Several field experiments have been carried out, under various light conditions, to evaluate the capabilities, as well as the limitations of the autonomous approach. GPS information is incorporated with the autonomous system to localize the detected defects. The field tests of the proposed system demonstrate its superior features compared to conventional approaches for pavement evaluation.

The autonomous system may be fully functional, even at night, without any need for a light source. This may makes it ideal for night-time condition assessment of roads and highways. The autonomous approach may be ideal for detecting defects that have a minimum lateral dimension of 15 mm and minimum depth of 12 mm. Using the autonomous pavement assessment system setup, the field of view may be about 830×650 square millimeters.

For field applications, there may be a need to extend the field of view. One possible solution may be the use of an array of MICROSOFT KINECT® motion sensing input devices to cover a larger area under inspection.

One aspect of the automated inspection systems is its capability of in-traffic inspection. Videos may be captured from defects while the data acquisition system is in motion.

MICROSOFT KINECT® motion sensing input device may be used for detection and quantification of defects. Severity categorization of the detected defects may also be made.

The depth, length, width, area, volume, and location of defects are obtained using the autonomous approach. With this information, it is possible to prioritize the defects and optimize a rehabilitation route. The route optimization can have a significant impact on reducing the maintenance and rehabilitation expenses.

Tight cracks may not be detected using the autonomous approach because the fixed IR pattern may not penetrate into tight gaps between crack edges. Consequently, depth information of such defects may not be obtained using the depth image. However, the RGB image can be used to detect and quantify tiny cracks. Data fusion of the RGB and depth images may then be performed. Previous studies have shown that cracks can be reliably detected and quantified on concrete surfaces using RGB. See Jahanshahi, M. R. and Masri, S. F. (2011). "Adaptive vision-based crack detection using 3d scene reconstruction for condition assessment of structures." *Automation in Construction*. DOI:10.1016/j.autcon.2011.11.018; and Jahanshahi, M. R., Masri, S. F., Padgett, C. W., and Sukhatme, G. S. (2011). "An innovative methodology for detection and quantification of cracks through incorporation of depth perception." *Machine Vision and Applications*. DOI: 10.1007/s00138-011-0394-0.

The system may quantify defects, categorize them based on available guidelines, and prioritize the defects for rehabilitation. The system may track the same defects over a period of time and use magnitude information, as well as detected rates in defect changes, to prioritize needed repairs. This system can then optimize the rehabilitation route, using GPS and GIS data, to reduce rehabilitation costs.

Crowd sourcing may be used with small embedded systems mounted on buses, police cars, etc. to continuously collect data regarding pavement. This collected data may be processed and stored in a database. This may increase the frequency of inspection.

The data captured from crowd sourcing may be used to track defect evolution and the serviceability of a given defect. Multiple sets of data from different vehicles may be consolidated as redundancies are eliminated.

A combination of defect detection, quantification, classification, localization, evolution monitoring, and serviceability prediction may be the output of the autonomous system which may include a Microsoft MICROSOFT KINECT® motion sensing input device as a defect detection and quantification module, a GPS and GIS device, route optimization and defect prioritization modules, and crowd sourcing. The detection, quantification, classification, localization, evolution monitoring, and serviceability prediction may all be performed in an unsupervised manner without training of the system.

The system that has been described may be integrated into smart cars. The smart cars may be configured to remember the locations of potholes and provide driver alerts to help the driver avoid them. A customer may register for a service that provides pothole map updates, detouring options, and such driver alerts, The data processing that has been described herein may be performed by one or more computer systems configured to perform these processing functions. The computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). The computer system may be a desktop computer or a portable computer, such as a laptop computer, a notebook computer, a tablet computer, a PDA, a smartphone, or part of a larger system, such a vehicle, appliance, and/or telephone system. The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by the computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A non-transitory, tangible, computer-readable storage medium containing a program of instructions configured to cause a computer system running the program of instructions to:
   receive depth data captured by a sensor that are indicative of the depth of pixels that collectively comprise a defective area of pavement;

dynamically fit a plane to pixels in the depth data that are not further than a threshold distance from the sensor;

generate a depth map of pixels that comprise the defective area that have a depth based on the plane;

generate a binary image of the defective area based on a second threshold, the binary image delineating pixels that meet or exceed the second threshold as a central portion of the defective area and pixels that fail to exceed the second threshold as a surrounding portion of the defective area; and restrict the area covered by the depth map to the central portion of the defective area; or wherein the threshold distance is the distance between the sensor and the pavement plus an amount based on sensor errors.

2. The medium of claim 1 wherein the program of instructions is configured to cause the computer system running the program of instructions to:

generate a binary image of the defective area based on a second threshold, the binary image delineating pixels that meet or exceed the second threshold as a central portion of the defective area and pixels that fail to exceed the second threshold as a surrounding portion of the defective area; and restrict the area covered by the depth map to the central portion of the defective area.

3. The medium of claim 1 wherein the program of instructions is configured to cause the computer system running the program of instructions to:

generate a histogram of the defective area that indicates the frequency of pixels at different depths within the defective area; and determine a depth threshold based on the histogram.

4. The medium of claim 3 wherein the program of instructions is configured to cause the computer system running the program of instructions to determine the depth threshold using the Otsu method.

5. The medium of claim 1 wherein the program of instructions is configured to cause the computer system running the program of instructions to fit the plane using RANSAC.

6. The medium of claim 1 wherein the program of instructions is configured to cause the computer system running the program of instructions to subtract the depth data for the defective area from the fitted plane.

7. The medium of claim 1 wherein the program of instructions is configured to cause the computer system running the program of instructions to determine the surface area of the defective area demarcated by the depth map.

8. The medium of claim 7 wherein the program of instructions is configured to cause the computer system running the program of instructions to determine the volume of the defective area demarcated by the depth map.

9. The medium of claim 8 wherein the program of instructions is configured to cause the computer system running the program of instructions to determine the depth of the defective area demarcated by the depth map.

10. The medium of claim 9 wherein the program of instructions is configured to cause the computer system running the program of instructions to determine the length and width of the defective area demarcated by the depth map.

11. The medium of claim 1 wherein the program of instructions is configured to cause the computer system running the program of instructions to:

receive depth data captured by the sensor that are indicative of the depth of pixels that collectively comprise multiple defective areas of pavement;

identify the multiple defective areas of pavement based on the depth data;

receive and store location information indicative of the location of each defective area;

dynamically fit a plane to pixels in the depth data that are not further than a threshold distance from the sensor at each defective area; and generate a depth map for each defective area that includes pixels that comprise the defective area based on the plane at that defective area.

12. The medium of claim 11 wherein the program of instructions is configured to cause the computer system running the program of instructions to prioritize the multiple defective areas for repair based on the depth maps.

13. The medium of claim 11 wherein the program of instructions is configured to cause the computer system running the program of instructions to generate optimized rehabilitation routes based on the depth maps and the location information.

14. The medium of claim 1 wherein the program of instructions is configured to cause the computer system running the program of instructions to receive an RGB image of the defective area of pavement and to utilize this RGB image in an analysis of the defective area.

15. The medium of claim 1 wherein the program of instructions to generate and analyze the depth map in an unsupervised manner without training of the computer system.

16. The medium of claim 1 wherein the threshold distance is the distance between the sensor and the pavement plus an amount based on sensor errors.

17. The medium of claim 16 wherein the amount is twice the standard deviation of the sensor errors.

* * * * *